(12) United States Patent
Schmidt (10) Patent No.: US 9,797,639 B2
(45) Date of Patent: Oct. 24, 2017

(54) METHOD FOR OPERATING A VAPOUR COMPRESSION SYSTEM USING A SUBCOOLING VALUE

(75) Inventor: Frede Schmidt, Soenderborg (DK)

(73) Assignee: Danfoss A/S, Nordborg (DK)

( * ) Notice: Subject to any disclaimer, the term of this patent is extended or adjusted under 35 U.S.C. 154(b) by 914 days.

(21) Appl. No.: 13/703,053

(22) PCT Filed: Jun. 29, 2011

(86) PCT No.: PCT/DK2011/000076
§ 371 (c)(1),
(2), (4) Date: Dec. 10, 2012

(87) PCT Pub. No.: WO2012/000501
PCT Pub. Date: Jan. 5, 2012

(65) Prior Publication Data
US 2013/0074535 A1   Mar. 28, 2013

(30) Foreign Application Priority Data
Jun. 30, 2010   (PA) .................................. 201000577

(51) Int. Cl.
*F25B 13/00*   (2006.01)
*F25B 49/02*   (2006.01)
(Continued)

(52) U.S. Cl.
CPC .............. *F25B 49/02* (2013.01); *F25B 40/00* (2013.01); *F25B 41/062* (2013.01);
(Continued)

(58) Field of Classification Search
CPC .................. F25B 13/00; F25B 2400/13; F25B 2700/21152; F25B 9/002; F25B 9/006;
(Continued)

(56) References Cited

U.S. PATENT DOCUMENTS 3,264,837 A * 8/1966 Harnish .................. F25B 13/00
                                                            62/117
4,045,977 A * 9/1977 Oliver, Jr. ..................... 62/324.4
(Continued)

FOREIGN PATENT DOCUMENTS

EP      1 620 684 A      2/2006
EP      1 965 160 A2     9/2008
(Continued)

OTHER PUBLICATIONS

A. Tambovtsev, H. Quack, Cop Improvement by Transfer of the Superheating into the Internal Heat Exchanger, International Congress of Refrigeration 2007, Beijing, ICR07-B2-1406, pp. 1-10.
(Continued)

*Primary Examiner* — Frantz Jules
*Assistant Examiner* — Meraj A Shaikh
(74) *Attorney, Agent, or Firm* — McCormick, Paulding & Huber LLP (57) ABSTRACT

A vapor compression system comprises a compressor, a condenser, an expansion device, e.g. in the form of an expansions valve, and an evaporator arranged along a refrigerant path. A method for operating the vapor compression system comprises the steps of: obtaining a superheat value being representative for the superheat of refrigerant entering the compressor; obtaining a subcooling value being representative for the subcooling of refrigerant entering the expansion device; and operating the expansion device on the basis of the obtained superheat value and on the basis of the obtained subcooling value. The subcooling value is taken into account when operating the expansion device, because variations in the subcooling value have significant influence on the refrigerating capacity of the evaporator at a given opening degree of the expansion device, thereby resulting in
(Continued)

a more stable operation of the system. The system may further comprise an internal heat exchanger.

9 Claims, 2 Drawing Sheets (51) Int. Cl.
F25B 40/00 (2006.01)
F25B 41/06 (2006.01)

(52) U.S. Cl.
CPC ....... F25B 2600/19 (2013.01); F25B 2600/21 (2013.01); F25B 2600/2513 (2013.01); F25B 2700/2103 (2013.01); F25B 2700/21151 (2013.01); F25B 2700/21175 (2013.01)

(58) Field of Classification Search
CPC .......... F25B 2341/0653; F25B 2400/12; F25B 40/00; F25B 41/062
USPC ......... 62/199, 513, 197, 208, 225, 222, 117, 62/160, 503
See application file for complete search history.

(56) References Cited

U.S. PATENT DOCUMENTS

| | | | |
|---|---|---|---|
| 4,499,739 A * | 2/1985 | Matsuoka | F25B 13/00 62/158 |
| 5,626,026 A | 5/1997 | Sumida et al. | |
| 6,164,086 A | 12/2000 | Kita et al. | |
| 6,581,397 B1 * | 6/2003 | Taira | F25B 9/002 62/199 |
| 7,980,086 B2 * | 7/2011 | Kotani | F25B 45/00 62/127 |
| RE43,805 E * | 11/2012 | Aoki | F25B 13/00 62/324.4 |
| 2006/0048539 A1 * | 3/2006 | Takechi | F25B 13/00 62/513 |
| 2006/0191286 A1 * | 8/2006 | Park | F25B 13/00 62/434 |
| 2007/0000262 A1 * | 1/2007 | Ikegami | F25B 41/00 62/170 |
| 2011/0083456 A1 * | 4/2011 | Wakamoto | F25B 41/00 62/115 |
| 2011/0174059 A1 * | 7/2011 | Yonemori | F25B 49/005 73/40 |

FOREIGN PATENT DOCUMENTS

| | | |
|---|---|---|
| JP | 5-223358 A | 8/1993 |
| JP | 6-137691 A | 5/1994 |
| JP | 2001-248920 A | 9/2001 |
| JP | 2001-263831 A | 9/2001 |
| JP | 2006-71211 A | 3/2006 |
| WO | 2007/130769 A2 | 11/2007 |

OTHER PUBLICATIONS

PCT Search Report for PCT Serial No. PCT/DK2011/000076 dated Mar. 23, 2012.

* cited by examiner

METHOD FOR OPERATING A VAPOUR COMPRESSION SYSTEM USING A SUBCOOLING VALUE

CROSS REFERENCE TO RELATED APPLICATIONS

This application is entitled to the benefit of and incorporates by reference essential subject matter disclosed in International Patent Application No. PCT/DK2011/000076 filed on Jun. 29, 2011 and Danish Patent Application No. PA 2010 00577 filed Jun. 30, 2010.

FIELD OF THE INVENTION

The present invention relates to a method for operating a vapour compression system, in particular a vapour compression system comprising a suction line heat exchanger. The method of the invention allows the vapour compression system, in particular vapour compression systems comprising a suction line heat exchanger, to be operated in a more stable manner than prior art methods. The invention further relates to a vapour compression system comprising a suction line heat exchanger.

BACKGROUND OF THE INVENTION

A vapour compression system usually comprises a compressor, a condenser, an expansion device and an evaporator arranged along a refrigerant path. Refrigerant flowing in the refrigerant path is alternatingly compressed and expanded, thereby providing either cooling or heating to a volume. In order to utilise the evaporating capacity of the evaporator to the greatest possible extent, it is desirable to control the flow of refrigerant through the evaporator in such a manner that liquid refrigerant is present throughout the evaporator. However, in the case that liquid refrigerant is allowed to pass through the evaporator there is a risk that this liquid refrigerant may reach the compressor. This may cause damage to the compressor and is therefore undesirable. Accordingly, it is often attempted to operate a vapour compression system in such a manner that liquid refrigerant is present almost through the evaporator, i.e. the superheat, i.e. the difference between the temperature of the refrigerant leaving the evaporator and the dew point of the refrigerant leaving the evaporator, is measured, and the supply of refrigerant to the evaporator is controlled in order to obtain a superheat which is small, but positive.

One disadvantage of the control strategy described above is, that the evaporating capacity of the evaporator is not utilised fully, because the superheat of the refrigerant leaving the evaporator must be positive in order to ensure that liquid refrigerant does not reach the compressor. In order to solve this problem an additional, internal heat exchanger may be arranged in the suction line of the vapour compression system, i.e. between the evaporator and the compressor. In this case refrigerant leaving the evaporator is heated in the internal heat exchanger. Thus, in the case that a small amount of liquid refrigerant leaves the evaporator, it is evaporated in the internal heat exchanger. Thereby liquid refrigerant can be present throughout the evaporator without risking that liquid refrigerant reaches the compressor.

In A. Tambovtsev et al., "COP improvement by transfer of the superheating into the internal heat exchanger", International Congress of Refrigeration 2007, Beijing, a refrigeration system is disclosed. The refrigeration system comprises a suction line heat exchanger in which the heat exchanging fluids flow in parallel in order to stabilise the system.

SUMMARY OF THE INVENTION

It is an object of embodiments of the invention to provide a method for operating a vapour compression system in which the operation of the vapour compression system is more stable than in prior art methods.

It is a further object of embodiments of the invention to provide a method for operating a vapour compression system in which a supply of refrigerant to an evaporator is controlled in a more precise and optimal manner than in prior art methods.

It is an even further object of embodiments of the invention to provide a vapour compression system in which the potential refrigeration capacity of an evaporator can be utilised to the greatest possible extent, without introducing instabilities in the operation of the vapour compression system.

According to a first aspect the invention provides a method for operating a vapour compression system, the vapour compression system comprising a compressor, a condenser, an expansion device and an evaporator arranged along a refrigerant path, the method comprising the steps of:
obtaining a superheat value being representative for the superheat of refrigerant entering the compressor,
obtaining a subcooling value being representative for the subcooling of refrigerant entering the expansion device, and
operating the expansion device on the basis of the obtained superheat value and on the basis of the obtained subcooling value.

In the present context the term 'vapour compression system' should be interpreted to mean any system in which a flow of refrigerant circulates and is alternatingly compressed and expanded, thereby providing either refrigeration or heating of a volume. Thus, the vapour compression system may be a refrigeration system, an air condition system, a heat pump, etc.

The compressor may be in the form of a single compressor, or it may be a compressor rack comprising two or more compressors.

The condenser and the evaporator are both heat exchangers arranged to exchange heat with an ambient medium, such as an air flow or a liquid flow. The condenser and/or the evaporator may comprise a single refrigerant flow path through which refrigerant flows through the condenser/evaporator. As an alternative, the condenser and/or the evaporator may comprise two or more refrigerant flow paths arranged fluidly in parallel between an inlet manifold and an outlet manifold. Such parallel refrigerant flow paths may be in the form of two or more parallel condensers/evaporators and/or in the form of two or more parallel tubes or coils arranged within a single condenser/evaporator. The refrigerant flow path(s) may be in the form of one or more microchannels.

The expansion device may be or comprise an expansion valve, such as an electronically controlled expansion valve or a thermostatic expansion valve. In this case a supply of refrigerant to the evaporator can be controlled by controlling the opening degree of the expansion valve. As an alternative, the expansion device may be or comprise an orifice, a capillary tube or any other suitable kind of expansion device.

According to the method of the invention, a superheat value being representative for the superheat of refrigerant entering the compressor is initially obtained. The superheat value may be the superheat, i.e. the temperature difference between the temperature of the refrigerant flowing towards the compressor and the dew point of the refrigerant flowing towards the compressor. As an alternative, it may be another suitable value which is representative for the superheat, for instance simply the temperature of the refrigerant flowing towards the compressor.

The superheat value may be measured directly, or it may be calculated or estimated on the basis of another measured parameter. For instance, in the case that the superheat value is simply the temperature of the refrigerant flowing towards the compressor, it may advantageously be measured directly. On the other hand, in the case that the superheat value is the actual superheat, it may advantageously be calculated or estimated on the basis of other measured parameters, e.g. the temperature and the pressure of the refrigerant flowing towards the compressor.

Next, a subcooling value being representative for the subcooling of refrigerant entering the expansion device is obtained. The subcooling value may be the subcooling, i.e. the temperature difference between the temperature of the refrigerant entering the expansion device and the saturation temperature of the refrigerant entering the expansion device. As an alternative, it may be another suitable value which is representative for the subcooling, for instance simply the temperature of the liquid part of the refrigerant entering the expansion device. It should be noted that for some purposes it will be sufficient to obtain a value which provides information of changes in the subcooling, i.e. a relative subcooling value instead of an absolute subcooling value. To this end the liquid temperature of the refrigerant entering the expansion device is a suitable value.

The subcooling value may be measured directly, or it may be calculated or estimated on the basis of another measured parameter.

Finally, the expansion device is operated on the basis of the obtained superheat value and on the basis of the obtained subcooling value. Thereby the superheat value as well as the subcooling value is taken into account when the expansion device is operated. Since the superheat value is taken into account, the expansion device can be operated in such a manner that the refrigerant supply to the evaporator provides an optimal or desired superheat of the refrigerant entering the compressor, e.g. a small but positive superheat or zero superheat, depending on the design of the vapour compression system. Accordingly, the potential refrigeration capacity of the evaporator can be utilised optimally, as described above.

The operation of the expansion device is performed on the basis of knowledge of the characteristics of the expansion device, including how the expansion device normally reacts to changes in the measured parameters. Such characteristics may, e.g., be established experimentally or may be calculated or estimated by the manufacturer.

Furthermore, it is an advantage that the subcooling value is taken into account when operating the expansion device, since the subcooling of refrigerant entering the evaporator has an influence on the refrigerating capacity of the evaporator at a given mass flow of refrigerant. For instance, in the case that the expansion device is or comprises a thermostatic expansion valve, the opening degree of the expansion valve determines the mass flow of refrigerant which is supplied to the evaporator. However, for a given opening degree of the expansion valve, the refrigerating capacity of the evaporator increases if the subcooling of the refrigerant entering the evaporator increases. Thus, controlling the expansion device on the basis of the subcooling, or at least on the basis of a value being indicative for the subcooling, allows this effect to be taken into account. In order to fulfil this purpose, it may be sufficient that the subcooling value provides information about variations in the subcooling, i.e. it may not be necessary to gain information about the absolute subcooling value. In any event, knowing the connection between the subcooling, or variations in the subcooling, and the refrigerating capacity of the evaporator, the opening degree can be adjusted in such a manner that an optimal superheat of refrigerant leaving the evaporator is obtained, regardless of the subcooling of refrigerant entering the evaporator. Thereby the operation of the expansion device becomes more precise, and an optimal superheat can be obtained for an increased part of the time. This is a great advantage.

The step of obtaining a subcooling value may comprise measuring a temperature of the refrigerant entering the expansion device. According to this embodiment, the measured temperature may be used for calculating the subcooling of refrigerant entering the evaporator. In this case, it is necessary to also measure or estimate the pressure of the refrigerant. As an alternative, the measured temperature may be used directly as the subcooling value, since variations in the temperature of the refrigerant entering the evaporator corresponds to variations in the subcooling. It is an advantage to use the measured temperature directly, since it is much easier to simply measure the temperature than it is to use the measured temperature for calculating the absolute value of the subcooling, and since it is most often sufficient to obtain information about the variations in the subcooling, in order to be able to adjust the operation of the expansion device appropriately.

The vapour compression system may further comprise an internal heat exchanger arranged to provide heat exchange between refrigerant flowing from the evaporator towards the compressor and refrigerant flowing from the condenser towards the expansion device. In this case the step of obtaining a superheat value may comprise measuring a temperature of refrigerant leaving the internal heat exchanger in a direction towards the compressor, and the step of obtaining a subcooling value may comprise measuring a temperature of refrigerant leaving the internal heat exchanger in a direction towards the expansion device.

An internal heat exchanger as described above is sometimes referred to as a suction line heat exchanger, since it is arranged in the suction line of the vapour compression system, i.e. it is arranged in a part of the refrigerant path which interconnects the evaporator and the compressor. According to this embodiment, the internal heat exchanger provides heat exchange between the hot refrigerant leaving the condenser and the cold refrigerant leaving the evaporator. Thereby the temperature of the refrigerant leaving the evaporator and flowing towards the compressor is increased, while the temperature of the refrigerant leaving the condenser and flowing towards the expansion device is decreased. Thus, if some liquid refrigerant has been allowed to pass through the evaporator, then this liquid part of the refrigerant can be evaporated in the internal heat exchanger, and thereby the liquid refrigerant is prevented from reaching the compressor, and the risk of causing damage to the compressor is reduced. Thus, the superheat zone is removed from the evaporator to the internal heat exchanger. Simultaneously it is possible to operate the vapour compression system in such a manner that liquid refrigerant is present through the entire length of the evaporator, thereby utilising the potential refrigeration capacity of the evaporator to the greatest possible extent.

Furthermore, the temperature difference at the evaporator can be decreased without increasing the charge of the vapour compression system.

Due to the decrease in the temperature of the refrigerant leaving the condenser and flowing towards the expansion device, the subcooling of the refrigerant is increased during the heat exchange in the internal heat exchanger. As mentioned above, this has an influence on how the expansion device should be operated in order to obtain an optimal superheat of the refrigerant leaving the evaporator.

As mentioned above, according to this embodiment, the step of obtaining a superheat value may comprise measuring a temperature of refrigerant leaving the internal heat exchanger in a direction towards the compressor, and the step of obtaining a subcooling value may comprise measuring a temperature of refrigerant leaving the internal heat exchanger in a direction towards the expansion device. Thus, the superheat value is obtained at a point after the internal heat exchanger, i.e. after possible liquid refrigerant leaving the evaporator has been evaporated by means of the internal heat exchanger. Accordingly, the expansion device can be operated in such a manner that it is obtained that essentially no liquid refrigerant reaches the compressor, and in such a manner that liquid refrigerant is present through the entire length of the evaporator. Furthermore, the subcooling value is also obtained at a point after the internal heat exchanger, i.e. after the subcooling has been increased due to the heat exchange. Accordingly, the obtained subcooling value is indicative for the subcooling of the refrigerant entering the expansion device, and in essence provides information about how much the subcooling has been increased due to the heat exchange taking place in the internal heat exchanger. Thereby it is possible to take this increase in subcooling into account when operating the expansion device.

The increase in subcooling arising in an internal or suction line heat exchanger may in some cases result in instabilities in the operation of the vapour compression system. However, since the method according to the invention takes the increase in subcooling into account in the operation of the expansion device, such instabilities can be avoided, or at least substantially reduced. The method according to the invention is therefore very advantageous for operating a vapour compression system comprising an internal or suction line heat exchanger.

The refrigerant flowing from the evaporator towards the compressor and the refrigerant flowing from the condenser towards the expansion device may flow in parallel in the internal heat exchanger. According to this embodiment, the internal heat exchanger is a so-called parallel flow heat exchanger or co-flow heat exchanger. Thereby the coldest refrigerant entering the internal heat exchanger from the evaporator is brought into thermal contact with the hottest refrigerant entering the internal heat exchanger from the condenser. Furthermore, parallel flow heat exchangers tend to adapt more easily to changes in the load of the vapour compression system than counter-flow heat exchangers, thereby 'disturbing' the system less. This has the consequence that the operation of the vapour compression system becomes relatively stable.

As an alternative, the internal heat exchanger may be a counter-flow heat exchanger, i.e. the refrigerant flowing from the evaporator towards the compressor and the refrigerant flowing from the condenser towards the expansion device may flow in opposite directions in the internal heat exchanger.

The method may further comprise the step of measuring a temperature of refrigerant flowing from the evaporator towards the internal heat exchanger. According to this embodiment, a value for the superheat of refrigerant leaving the evaporator, and before entering the internal heat exchanger, can be obtained.

The step of operating the expansion device may comprise controlling an opening degree of the expansion device. According to this embodiment, the expansion device may advantageously be or comprise a thermostatic expansion valve.

The method may further comprise the step of operating the expansion device purely on the basis of an obtained superheat value during start-up of the vapour compression system. According to this embodiment, the vapour compression system is operated in accordance with a 'two-step' strategy, where the vapour compression system is initially operated in an ordinary manner, i.e. purely on the basis of the superheat of refrigerant leaving the evaporator and entering the compressor. In the case that the vapour compression system comprises an internal heat exchanger as described above, the superheat value may be obtained either in the refrigerant path between the evaporator and the internal heat exchanger, i.e. before the refrigerant enters the internal heat exchanger, or in the refrigerant path between the internal heat exchanger and the compressor, i.e. after the refrigerant has undergone heat exchange in the internal heat exchanger.

Subsequently, when the start-up of the vapour compression system has been completed, the vapour compression system is operated according to the method of invention, i.e. the expansion device is operated on the basis of the obtained superheat value as well as on the basis of the obtained subcooling value.

The 'two-step' strategy described above may be advantageous, because the control method according to the invention is very sensitive to variations in the suction pressure. Large variations in the suction pressure are likely to occur during a start-up sequence of the vapour compression system, and it may therefore be preferable to operate the vapour compression system in accordance with a prior art method during the start-up, even though the prior art method does not take the subcooling into account. A start-up sequence is expected to run during a time interval which is smaller than 30 minutes, such as between 0 minutes and 30 minutes, such as between 5 minutes and 20 minutes, such as between 10 minutes and 15 minutes.

According to a second aspect the invention provides a vapour compression system comprising a compressor, a condenser, an expansion device and an evaporator arranged along a refrigerant path, and an internal heat exchanger arranged to exchange heat between refrigerant flowing from the evaporator towards the compressor and refrigerant flowing from the condenser towards the expansion device, the vapour compression system further comprising a first sensor arranged to measure a value being representative for a superheat value, said first sensor being arranged in the refrigerant path between the internal heat exchanger and the compressor, and a second sensor arranged to measure a value being representative for a subcooling value, said second sensor being arranged in the refrigerant path between the internal heat exchanger and the expansion device.

It should be noted that a person skilled in the art would readily recognise that any feature described in combination with the first aspect of the invention could also be combined with the second aspect of the invention, and vice versa. Thus, the vapour compression system according to the second aspect of the invention may advantageously be operated in accordance with the method according to the first aspect of the invention.

Since the vapour compression system is provided with a first sensor arranged to measure a value being representative for a superheat value, said first sensor being arranged in the refrigerant path between the internal heat exchanger and the compressor, and a second sensor arranged to measure a value being representative for a subcooling value, said second sensor being arranged in the refrigerant path between the internal heat exchanger and the expansion device, it is possible to obtain such superheat values and subcooling values and to operate the expansion device on the basis of these values. Thereby the advantages described above with reference to the first aspect of the invention can be obtained.

The vapour compression system may, e.g., be a refrigeration system, an air condition system, a heat pump, or any other suitable kind of vapour compression system.

The vapour compression system may further comprise a controller being adapted to operate the expansion device on the basis of values obtained by means of the first sensor and the second sensor. Thereby the advantages described above are obtained.

The internal heat exchanger may be a parallel flow heat exchanger, i.e. the refrigerant flowing in the internal heat exchanger from the condenser towards the expansion device and the refrigerant flowing in the internal heat exchanger from the evaporator towards the compressor may flow in parallel. As described above, the coldest refrigerant entering the internal heat exchanger from the evaporator is thereby brought into thermal contact with the hottest refrigerant entering the internal heat exchanger from the condenser. This has the consequence that the operation of the vapour compression system becomes relatively stable.

The vapour compression system may further comprise a third sensor arranged to measure a value being representative for a superheat value, said third sensor being arranged in the refrigerant path between the evaporator and the internal heat exchanger. Such a third sensor may provide information regarding the superheat of refrigerant leaving the evaporator before heat exchange takes place in the internal heat exchanger, thereby evaporating any liquid refrigerant leaving the evaporator. This additional superheat value may, e.g., be used for controlling the expansion device during a start-up sequence where the expansion device is controlled purely on the basis of the superheat.

BRIEF DESCRIPTION OF THE DRAWINGS

The invention will now be described in further detail with reference to the accompanying drawings in which.

DETAILED DESCRIPTION

Figure 1:
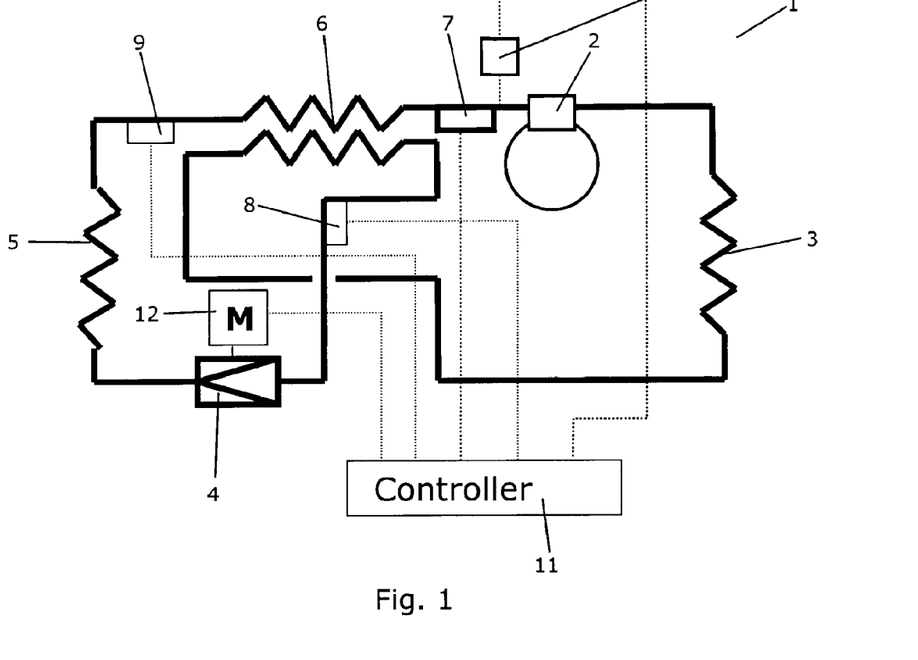
FIG. 1 is a diagrammatic view of a vapour compression system according to an embodiment of the invention.

FIG. 1 is a diagrammatic view of a vapour compression system 1 according to an embodiment of the invention. The vapour compression system 1 comprises a compressor 2, a condenser 3, an expansion device 4 in the form of an expansion valve, and an evaporator 5. The vapour compression system 1 further comprises an internal heat exchanger 6 arranged in the suction line of the vapour compression system 1. In the internal heat exchanger 6 heat exchange takes place between refrigerant flowing in the suction line from the evaporator 5 towards the compressor 2, and refrigerant flowing from the condenser 3 towards the expansion device 4. Thereby cool refrigerant flowing from the evaporator 5 towards the compressor 2 is heated, while hot refrigerant flowing from the condenser 3 towards the expansion device 4 is cooled. The internal heat exchanger 6 is a parallel flow heat exchanger, i.e. the two flows of refrigerant flow in parallel in the internal heat exchanger 6.

As described above, the heat exchange taking place in the internal heat exchanger 6 ensures that any liquid refrigerant which may leave the evaporator 5 is evaporated in the internal heat exchanger 6, and that a superheat is created in the refrigerant, thereby ensuring that the refrigerant reaching the compressor 2 is in a substantially gaseous state. This allows the vapour compression system 1 to be operated in such a manner that liquid refrigerant is present throughout the evaporator 5 without risking that liquid refrigerant reaches the compressor 2. Thereby the potential refrigeration capacity of the evaporator 5 can be utilised to the greatest possible extent, without risking damage to the compressor 2.

At the same time the internal heat exchanger 6 causes the subcooling of the refrigerant flowing in the liquid line, i.e. from the condenser 3 towards the expansion device 4, to be increased.

A first sensor 7 is arranged in the refrigerant path between the internal heat exchanger 6 and the compressor 2. The first sensor 7 is arranged for measuring the temperature of the refrigerant leaving the internal heat exchanger 6. Thereby the values measured by means of the first sensor 7 are representative for the superheat of the refrigerant leaving the internal heat exchanger 6 and flowing towards the compressor 2.

A second sensor 8 is arranged in the refrigerant path between the internal heat exchanger 6 and the expansion device 4. The second sensor 8 is arranged for measuring the temperature of the refrigerant leaving the internal heat exchanger 6, and possibly also the pressure of the refrigerant. Thereby the values measured by the second sensor 8 are representative for the subcooling of the refrigerant being supplied to the expansion device 4. Preferably, the second sensor 8 is arranged for measuring only a temperature value. Thereby changes in the subcooling of the refrigerant can be monitored, since changes in the temperature reflect changes in the subcooling, but absolute values of the subcooling are not obtained. However, this is often sufficient for the purpose of controlling the expansion device 4, and it is much simpler to measure the temperature than to obtain absolute values for the subcooling.

A third sensor 9 is arranged in the refrigerant path between the evaporator 5 and the internal heat exchanger 6. The third sensor 9 is arranged for measuring the temperature of the refrigerant leaving the evaporator 5, and possibly also the pressure of the refrigerant. Thereby the values measured by the third sensor 9 are representative for the superheat of the refrigerant leaving the evaporator 5 and before heat exchange takes place in the internal heat exchanger 6. Values measured by the third sensor 9 may advantageously be used only during a start-up sequence of the vapour compression system 1. This will be described in further detail below.

A pressure sensor 10 is arranged in the refrigerant path near the first sensor 7 for measuring the pressure of the refrigerant leaving the internal heat exchanger 6. The measured pressure may, together with the temperature signal obtained by the first sensor 7, be used for calculating the superheat of the refrigerant entering the compressor 2.

Each of the sensors 7, 8, 9, 10 communicates with a controller 11. Thus, the controller 11 receives measured values from each of the sensors 7, 8, 9, 10, and based on these measured values an output signal for an actuator 12 is generated. In response to the generated output signal, the actuator 12 operates the expansion device 4, e.g. by adjusting an opening degree, in such a manner the potential refrigeration capacity of the evaporator 5 is utilised to the greatest possible extent, without risking damage to the compressor 2 due to liquid refrigerant reaching the compressor 2.

Figure 2:
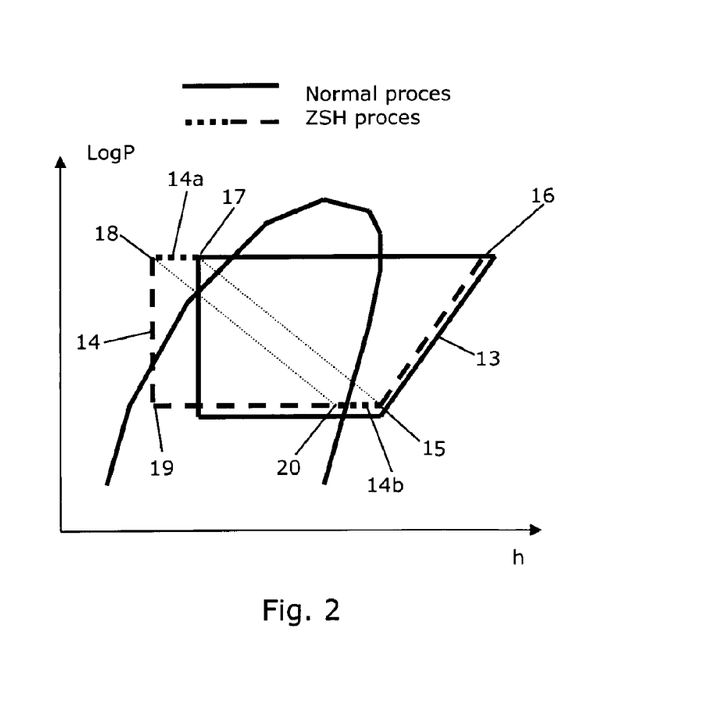
FIG. 2 is a pressure-enthalpy diagram illustrating operation of the vapour compression system of FIG. 1, and in accordance with a method according to an embodiment of the invention.

In the following the operation of the vapour compression system 1 of FIG. 1 will be described with reference to FIG. 1 and FIG. 2. FIG. 2 is a pressure-enthalpy diagram illustrating operation of the vapour compression system 1 of FIG. 1. The solid line 13 represents the operation of the vapour compression system 1 using a prior art control method where the expansion device 4 is controlled purely on the basis of a measured superheat value of refrigerant leaving the evaporator 5, and where the vapour compression system 1 is not provided with an internal heat exchanger 6. The dashed line 14 represents the operation of the vapour compression system 1 in accordance with a method according to an embodiment of to the invention.

Initially, i.e. during start-up of the vapour compression system 1, the vapour compression system 1 is preferably operated in accordance with a prior art control strategy, where the expansion device 4 is operated purely on the basis of a measured value of the superheat of refrigerant leaving the evaporator 5. In this case the controller 11 operates the expansion device 4 purely on the basis of measurements performed by the third sensor 9.

When the vapour compression system 1 operates properly, e.g. after approximately 10-15 minutes, the control strategy is changed to a method according to an embodiment of the invention. In this case the controller 11 operates the expansion device 4 on the basis of measurements performed by the first sensor 7 as well as on the basis of measurements performed by the second sensor 8, and the dashed line 14 of the pressure-enthalpy diagram is followed.

The reason for this two-step operation of the vapour compression system 1 is that the control of the vapour compression system 1 according to an embodiment of the invention is very sensitive to disturbances in the suction pressure. During start-up of the vapour compression system 1 such variations are expected, in particular in the case that the compressor 2 is in the form of a compressor rack comprising two or more compressors which are switched on or off in order to allow the vapour compression system 1 to match the refrigeration load. During start-up of the vapour compression system 1 a lot of switching on and off of the compressors is expected, thereby resulting in significant disturbances in the suction pressure, and it is therefore advantageous to operate the vapour compression system 1 in accordance with a prior art method during start-up.

Once the start-up sequence has been completed, the vapour compression system 1 is operated in accordance with a method according to an embodiment of the invention, and following the dashed line 14 of the pressure-enthalpy diagram. From point 15 to point 16 the refrigerant is compressed in the compressor 2, resulting in an increase in enthalpy as well as an increase in pressure. It is clear from FIG. 2 that during this process the enthalpy is slightly lower than it is the case when the vapour compression system 1 is operated in accordance with a prior art method, illustrated by the solid line 13.

From point 16 to point 17 the refrigerant is condensed in the condenser 3. During this the pressure is maintained at a substantially constant level, while the enthalpy is reduced. From point 17 to point 18, the refrigerant passes through the internal heat exchanger 6. It is clear from FIG. 2 that this results in the enthalpy being further reduced, while the pressure stays at the substantially constant level. Accordingly, the subcooling of the refrigerant leaving the condenser 3 is increased due to heat exchange taking place in the internal heat exchanger 6. This is illustrated by the dashed portion 14a. It is clear from FIG. 2 that this additional increase in subcooling is not obtained in the prior art method, i.e. when an internal heat exchanger 6 is not provided.

From point 18 to point 19 the refrigerant is expanded in the expansion device 4, resulting in a decrease in pressure, while the enthalpy is maintained at a substantially constant level. For this purpose the expansion device 4 is operated on the basis of measurements performed by the first sensor 7 as well as on the basis of measurements performed by the second sensor 8. Thus, the expansion device 4 is operated on the basis of a measured superheat value of refrigerant leaving the internal heat exchanger 6, and with due consideration to the subcooling, or at least to changes in the subcooling, of refrigerant being supplied to the expansion device 4.

It is clear from FIG. 2 that the pressure level reached during the expansion step when operating the vapour compression system 1 in accordance with a method according to an embodiment of the invention is slightly higher than the pressure level reached when operating the vapour compression system 1 according to a prior art method. It is also clear that a larger part of the expansion takes place in the liquid zone when the vapour compression system 1 is operated in accordance with a method according to an embodiment of the invention.

From point 19 to point 20 the refrigerant passes through the evaporator 5, and at least a part of the refrigerant undergoes evaporation. Thus, during this step the enthalpy increases while the pressure is maintained at a substantially constant level. It is clear from FIG. 2 that the refrigerant is still in the mixed phase when leaving the evaporator 5, i.e. no superheat is created in the evaporator 5, and the potential refrigeration capacity of the evaporator 5 is utilised to the maximum extent.

From point 20 to point 15, the refrigerant passes through the internal heat exchanger 6. This results in the enthalpy being further increased while the pressure remains at the substantially constant level. Thereby a positive superheat is introduced in the refrigerant, represented by the line 14b, and it is thereby prevented that liquid refrigerant reaches the compressor 2. It is clear from FIG. 2 that the enthalpy decrease represented by the line 14a corresponds to the enthalpy increase represented by line 14b.

Figure 3A:
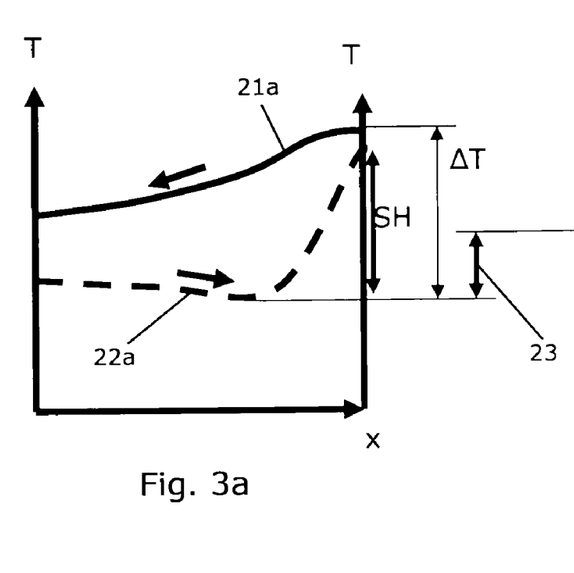
FIGS. 3a and 3b are heat exchanger diagrams for an evaporator operated with superheat and an evaporator operated without superheat, respectively.
Figure 3B:
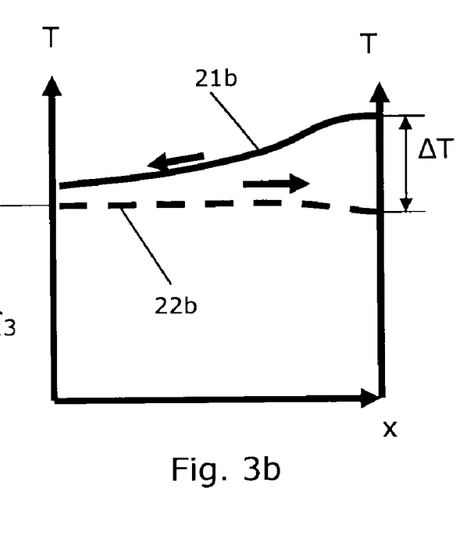

FIGS. 3a and 3b are heat exchanger diagrams for an evaporator operated with superheat and an evaporator operated without superheat, respectively. The diagram of FIG. 3a corresponds to the situation illustrated by the solid line 13 in FIG. 2, and the diagram of FIG. 3b corresponds to the situation illustrated by the dashed line 14 in FIG. 2.

In FIGS. 3a and 3b the solid line 21 illustrates the temperature of the flow of fluid flowing across the evaporator as a function of position along the evaporator, and the dashed line 22 illustrates the evaporator temperature as a function of position along the evaporator.

In FIG. 3a the temperature of the refrigerant towards the end of the evaporator increases significantly due to the superheat introduced in the refrigerant in the evaporator. Thereby the evaporator temperature is also increased towards the end of the evaporator. In this case a temperature difference between the evaporator temperature and the temperature of the cooled fluid, ΔT, which exceeds the superheat, SH, is required. Accordingly, the evaporator temperature must be very low.

In FIG. 3b, on the other hand, no superheat is introduced in the refrigerant in the evaporator. Accordingly, the requirements to the temperature difference between the evaporator and the cooled fluid, ΔT, are reduced. Accordingly, the evaporator temperature can be increased as compared to the situation illustrated in FIG. 3a, as illustrated by arrow 23.

Thus, it is clear from FIGS. 3a and 3b that when the vapour compression system is operated in accordance with a method according to an embodiment of the invention, the temperature difference at the evaporator can be decreased without increasing the charge of the vapour compression system.

The arrows above the lines in the graphs of FIGS. 3a and 3b illustrate the flow direction of the refrigerant flowing in the evaporator and the fluid flowing across the evaporator, respectively.

Although various embodiments of the present invention have been described and shown, the invention is not restricted thereto, but may also be embodied in other ways within the scope of the subject-matter defined in the following claims.

What is claimed is:

1. A method for operating a vapour compression system, the vapour compression system comprising a compressor, a condenser, an expansion device and an evaporator arranged along a refrigerant path, the method comprising the steps of:
    obtaining a superheat value being representative for the superheat of refrigerant entering the compressor,
    measuring a temperature of the refrigerant entering the expansion device, obtaining a subcooling value based at least in part on the measured temperature of the refrigerant entering the expansion device, the subcooling value being representative for the subcooling of refrigerant entering the expansion device, and
    operating the expansion device only on the basis of the obtained superheat value during start-up of the vapour compression system, and operating the expansion device on the basis of the obtained superheat value as well as on the basis of the obtained subcooling value during normal operation of the vapour compression system.

2. The method according to claim 1, wherein the vapour compression system further comprises an internal heat exchanger arranged to provide heat exchange between refrigerant flowing from the evaporator towards the compressor and refrigerant flowing from the condenser towards the expansion device, and wherein the step of obtaining a superheat value comprises measuring a temperature of refrigerant leaving the internal heat exchanger in a direction towards the compressor, and the step of obtaining a subcooling value comprises measuring a temperature of refrigerant leaving the internal heat exchanger in a direction towards the expansion device.

3. The method according to claim 2, wherein the refrigerant flowing from the evaporator towards the compressor and the refrigerant flowing from the condenser towards the expansion device flow in parallel in the internal heat exchanger.

4. The method according to claim 2, further comprising the step of measuring a temperature of refrigerant flowing from the evaporator towards the internal heat exchanger.

5. The method according to claim 1, wherein the step of operating the expansion device comprises controlling an opening degree of the expansion device.

6. A vapour compression system comprising a compressor, a condenser, an expansion device and an evaporator arranged along a refrigerant path, and an internal heat exchanger arranged to exchange heat between refrigerant flowing from the evaporator towards the compressor and refrigerant flowing from the condenser towards the expansion device, the vapour compression system further comprising a first sensor arranged to measure a value being representative for a superheat value, said first sensor being arranged in the refrigerant path between the internal heat exchanger and the compressor, a second sensor arranged in the refrigerant path between the internal heat exchanger and the expansion device to measure a temperature of refrigerant leaving the internal heat exchanger in a direction towards the expansion device, the measured temperature being representative for a subcooling value, a third sensor arranged to measure a value being representative for a superheat value, said third sensor being arranged in the refrigerant path between the evaporator and the internal heat exchanger, and a controller adapted to operate the expansion device only on the basis of the values obtained by means of the third sensor during start-up of the vapour compression system, and on the basis of values obtained by means of the first sensor as well as on the basis of values obtained by means of the second sensor during normal operation of the vapour compression system.

7. The vapour compression system according to claim 6, wherein the internal heat exchanger is a parallel flow heat exchanger.

8. The method according to claim 1, wherein the vapour compression system further comprises an internal heat exchanger arranged to provide heat exchange between refrigerant flowing from the evaporator towards the compressor and refrigerant flowing from the condenser towards the expansion device, and wherein the step of obtaining a superheat value comprises measuring a temperature of refrigerant leaving the internal heat exchanger in a direction towards the compressor, and the step of measuring the temperature of the refrigerant entering the expansion device comprises measuring a temperature of refrigerant leaving the internal heat exchanger in a direction towards the expansion device.

9. The method according to claim 3, further comprising the step of measuring a temperature of refrigerant flowing from the evaporator towards the internal heat exchanger.

* * * * *

UNITED STATES PATENT AND TRADEMARK OFFICE
CERTIFICATE OF CORRECTION

PATENT NO. : 9,797,639 B2  
APPLICATION NO. : 13/703053  
DATED : October 24, 2017  
INVENTOR(S) : Frede Schmidt

Page 1 of 1

It is certified that error appears in the above-identified patent and that said Letters Patent is hereby corrected as shown below:

On the Title Page

Under the Foreign Application Priority Data, please delete "(PA)" and insert -- (DK) --.

Signed and Sealed this
Twenty-seventh Day of February, 2018

Andrei Iancu
*Director of the United States Patent and Trademark Office*